United States Patent [19]

Kauffman

[11] Patent Number: 5,625,766

[45] Date of Patent: Apr. 29, 1997

[54] SOFTWARE BASED PROOFING METHOD FOR DOUBLE SIDED PRINTING

[75] Inventor: David S. Kauffman, Vancouver, Canada

[73] Assignee: Creo Products Inc., Burnaby, Canada

[21] Appl. No.: 439,473

[22] Filed: May 11, 1995

[51] Int. Cl.$^6$ .................................................. G06F 15/00
[52] U.S. Cl. .......................................................... 395/135
[58] Field of Search .................................. 395/135, 107, 395/108, 111, 131, 104; 345/199, 151

[56] References Cited

U.S. PATENT DOCUMENTS

| | | | |
|---|---|---|---|
| 5,412,767 | 5/1995 | Long | 395/133 |
| 5,438,651 | 8/1995 | Suzuki et al. | 395/131 |

OTHER PUBLICATIONS

"Understanding Digital Color", Published by Graphic Arts Technical Association (GATF), Publication No. 1433, Published 1995.

Primary Examiner—Phu K. Nguyen

[57] ABSTRACT

A software based proofing method allowing to proof and measure registration between both sides of a press sheet by displaying, on a color monitor, both sides superimposed on each other. By making the paper appear transparent the front-to-back registration can be accurately measured and corrected. The data to be displayed is taken from a low resolution raster processor identical in operation to a full resolution raster processor used to generate the output data for the film or plate imaging device. For color files the color separation files are used instead of the composite file in order to be able to proof color registration and trapping between any colors. By using the same files as the imaging device the highest accuracy is achieved.

4 Claims, 1 Drawing Sheet

SOFTWARE BASED PROOFING METHOD FOR DOUBLE SIDED PRINTING

BACKGROUND OF THE INVENTION

The present invention relates to the printing industry and more specifically to the verification of data files before generating a printing plate. Such verification, known as proofing, is normally done by printing out the file using a laser printer, color printer or similar low resolution device. When films are used to make plates the films can be used for proofing before plates are imaged and printed. With the trend to eliminate use of film, a trend known as "Computer-to-Plate" systems, film is no longer available for proofing. All solutions generating a low resolution paper proofs, both color and monochrome, have common drawbacks. First, the cost of materials is significant for color proofs. Second, the time it takes to print out a color proof is significant. Third, due to cost limitations, the resolution of these proofing devices is too low in order to accurately measure registration errors and color overlap (trapping") errors.

Software based proofing is available (reading a document on a computer before printing it out is proofing) but prior art does not fill the needs of the printer. The shortcomings of prior art software proofing are: First, most systems proof from the input, typically PostScript, data (PostScript is a trademark of Adobe and is the most common input format in the printing business). An accurate proof requires looking at the rasterized data instead of PostScript as errors can occur in the rasterizing for the output device (rasterizing takes place, of course, in the display but it uses a different rasterizing engine and algorithm than the output device). Second, PostScript does not allow the front-to-back overlay of two files printed on both sides of a sheet of paper. This front-to-back registration is one of the crucial items to be proofed. Third, most image viewing programs operate on the composite color files which does not allow the ability to selectively control which colors are displayed together. It is an object of the present invention to overcome the limitations of prior art software based proofing and bring it to performance level equivalent to paper proofs without the delays and costs associated with the latter. A further object is to accurately measure the registration errors and produce correction data in order to eliminate the need for many proofs. These and other objects of the present invention will become apparent from reading the following description in conjunction with the drawing.

SUMMARY OF THE INVENTION

The present invention is a software based proofing method allowing to proof and measure registration between both sides of a press sheet by displaying on a color monitor both sides superimposed on each other. By making the paper appear transparent the front-to-back registration can be accurately measured, using a magnified view of the data and an "electronic yardstick", similar to methods used in computer-aided-design. The data to be displayed is taken from a low resolution raster processor identical in algorithm and operation to the full resolution rasterizer used to generate the raster data for the output device, typically a computer-to-plate machine. By using the same rasterizer for display and for output, any errors or problems with the rasterization process will show up on the display. For color files, the color separation files are used instead of the composite files in order to be able to proof color registration and trapping between any combination of colors. As most presses print multiple pages with one plate (typically four or eight) the output files, after imposition, are very large. (Imposition is the process of combining images of individual pages to large files covering the whole area of the printed sheet). To eliminate the transfer of needless data to the display, the location coordinates of each page are recorded together with the imposition. These coordinates are used to address the correct section of the rasterized image files and transfer to the display only the data to be displayed, while maintaining the registration between different impositions.

DESCRIPTION OF THE PREFERRED EMBODIMENT

Figure 1:
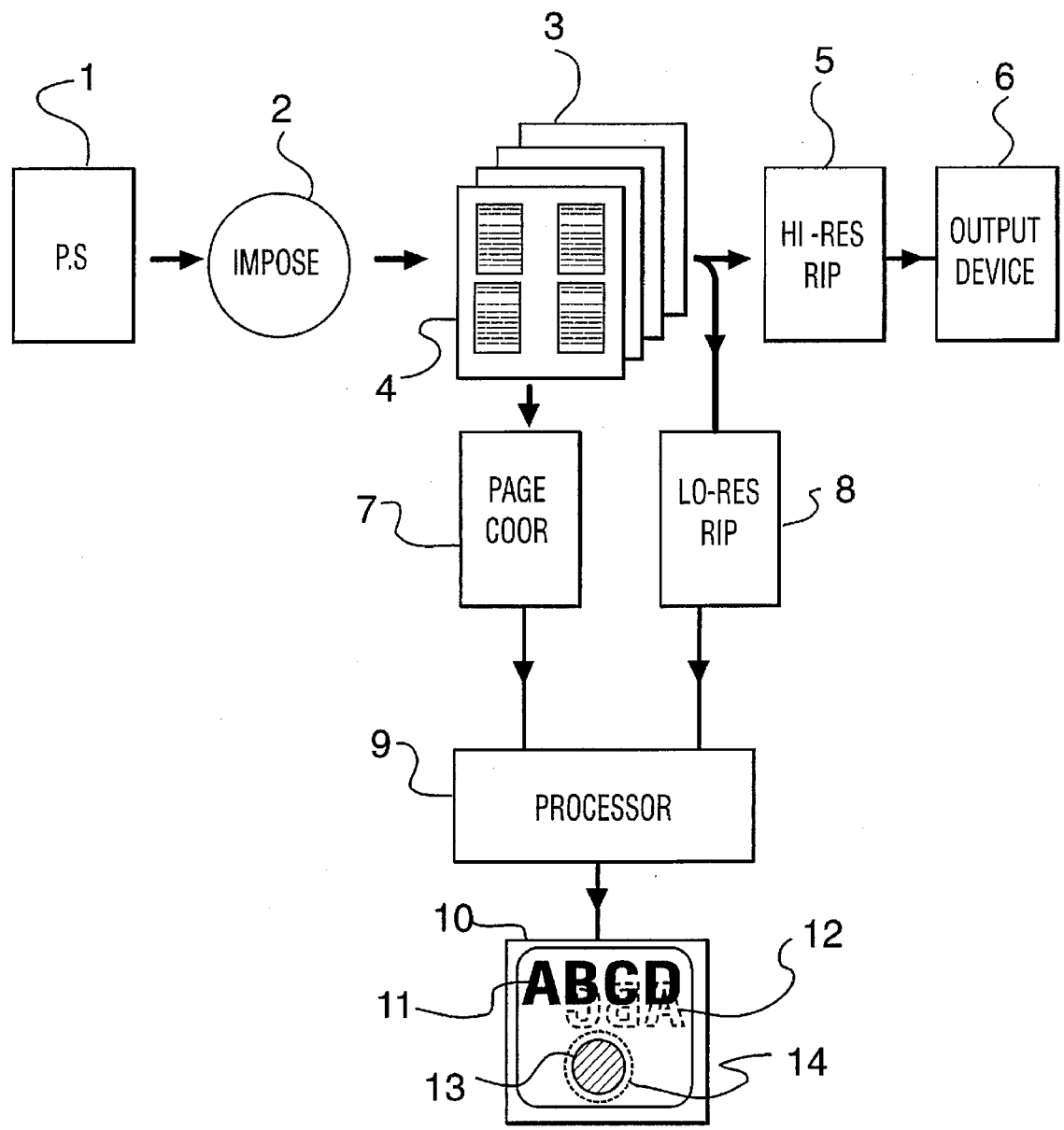
FIG. 1 is a schematic representation, in symbolic block-diagram form, of the steps required to generate an accurate proof.

As the invention is implemented in software, FIG. 1 is only a symbolic representation of the preferred embodiment. As an example of the embodiment the program implementing this invention is given as an appendix to this specification. The program is written in the C++ language and was run on a Alpha computer, made by Digital Equipment Corporation, under the NT operating system, made by Microsoft. Obviously it will run on any computer under the NT operating systems and can be easily re-written in any other programming language.

Referring how to FIG. 1, input data to be printed is delivered in PostScript format 1 to an imposition program 2. The imposition program combines the individual page data 4 to a full sheet, or flat, format 3 which matches the printing press format to be used for printing the data. Since the imposition is press specific it is usually done as the last stage. The imposition is done separately for each color as the printing press requires a separate plate for each color. The imposed PostScript flats have to be rasterized at high resolution via a Raster Image Processor, or RIP, 5 and fed to an output device 6 (such as a computer-to-plate exposure unit). The imposition software is commercially available from suppliers such as Scenic Soft (Seattle, Wash.). The RIP is commercially available from supplier such as Adobe (U.S.) or Harlequin (U.K.). For detailed discussion of all the previous steps and software proofing please refer to the book "Understanding Digital Color" published in 1995 by the Graphic Arts Technical Foundation (GATF publication number 1433) or any other publication on the subject. The raster files from RIP 5 can also be stored on a data storage device, such as a magnetic disc, before being sent to the output device 6. The most common data format for the rasterized data is known as TIFF. In order to proof the separated and imposed files 3, a low resolution RIP 8 is used to generate a sub-sampled version of the output files. It is important that the low resolution RIP 8 is identical, except resolution, to the RIP 5 so any problem with the data can be detected by looking at the low resolution file on a color monitor 10. Since the resolution of color monitor 10 is limited compared to output device 6 it is best to proof on a page-by-page basis. Each one of the individual pages 4 is displayed. Sometimes it is desirable to enlarge the display even further and display only a segment of a page, 11. In order to economize on data transfer and processing the coordinates of each page are recorded in a separate file 7 when imposition 4 is prepared. These coordinates are used by display processor 9 to strip all the data not to be displayed and pass on to display 10 only the net page data. The system can store a second set of impositions 3 representing the data to be printed on the other side of the paper. By displaying the data to be printed on the front of a sheet 11 superimposed with the data to be printed on the other side of the sheet 12 the front-to-back registration can be checked. Moreover, as the data was displayed using coordinates relating to the true position of the data relative to the complete imposition (and printed sheet) the display truly represents the registration on the printed sheet. For color printing, any two of the CMYK impositions can be overlapped to check for correct trapping (trapping is intentional color overlap to improve immunity to misregistration). Handling the files as color separated impositions allows proofing in a realistic fashion, as the printing is also done one color at a time. PostScript format does not allow these operations directly. When displaying both sides of the printed sheet, such as 11 (front) and 12 (back), the backside image 12 needs to be mirror-imaged to simulate "transparent paper". This is a standard command in displays and need not be elaborated here. It is also apparent that the invention is useful for other data input formats, including raster formats such as TIFF/IT. In case of raster formats the high resolution data is sub-sampled or filtered into low resolution data fed to the display processor.

I claim:

1. A method for proofing the front-to-back registration of a sheet printed on both sides from plates generated by an output device, comprising of the following steps:

generating an imposition from all the pages to be printed on the front of said printed sheet;

generating and imposition from all the pages to be printed on the back side of said printed sheet;

generating a raster file of the imposed data to be printed at the full resolution of the output device used to image said data;

generating a second raster file of said data at a lower resolution than said first raster file and storing at least one of said second raster files for each side of said printed sheet;

displaying the image of said second raster file of front side of said printed sheet on a display device simultaneously with the image of said second raster file of back side of said sheet, image of back side of said sheet being mirror imaged but in correct spatial registration to image of front side, said simultaneous display creating the appearance of a said sheet being printed on transparent material.

2. A method for color proofing as claimed in claim 1 wherein said display device is a color display and a different color is used to display each one of the said imposed and rasterized files.

3. A method for color proofing as claimed in claim 1 wherein said second raster file is generated by a rastering device identical in operation to rastering device used to generate said first raster file in order to eliminate errors in proofing caused by differences in rastering.

4. A method for color proofing as claimed in claim 1 wherein the said printed sheet is printed in multiple colors, each one of said colors using a separate raster file, and any combination of said second low resolution raster files can be displayed simultaneously in order to check trapping as well as front-to-back registration.

* * * * *